United States Patent [19]
Tanaka et al.

[11] Patent Number: 5,275,543
[45] Date of Patent: Jan. 4, 1994

[54] OLDHAM RING OF SCROLL TYPE COMPRESSOR

[75] Inventors: Tadashi Tanaka, Konan; Masaaki Sakamoto, Nagoya; Toshio Egami, Aichi; Izumi Maruyama, Komaki; Yoshiaki Sato, Gifu, all of Japan

[73] Assignee: Daido Metal Company, Ltd., Nagoya, Japan

[21] Appl. No.: 945,568

[22] Filed: Sep. 16, 1992

[30] Foreign Application Priority Data
Sep. 17, 1991 [JP] Japan ................. 3-236268

[51] Int. Cl.⁵ .................... F01C 1/02; F01C 1/063
[52] U.S. Cl. ........................ 418/55.3; 464/104
[58] Field of Search ............. 418/55.3; 464/102, 104

[56] References Cited

U.S. PATENT DOCUMENTS
5,125,810  6/1992  Suefuji et al. ................. 418/55.3

FOREIGN PATENT DOCUMENTS
0362513  4/1990  European Pat. Off.
0134882  6/1988  Japan ................. 418/55.3
0012002  1/1989  Japan ................. 418/55.3
0067481  3/1990  Japan ................. 418/55.3
2-48887  11/1990  Japan .
2-83882  11/1990  Japan .

Primary Examiner—Richard A. Bertsch
Assistant Examiner—Charles G. Freay
Attorney, Agent, or Firm—Browdy and Neimark

[57] ABSTRACT

An Oldham ring of a scroll type compressor having a swivel scroll of aluminum alloy. The Oldham ring is of cast aluminum alloy and has a pair of projections (a) serving to engage with a pair of guide grooves formed in a surface of the swivel scroll adjacent to a crankshaft. Sliding surfaces of the projections which are to be brought into contact with inner surfaces of the guide grooves are each covered with a metal sheet made of a metal which is different from aluminum and aluminum alloys. It is recommended that the metal sheet has the following thickness (t): t=0.5–2.5 mm, $T/20 \leq t \leq T/4$ (where, T represents the widthwise dimension of the projection in the circumferential direction of the Oldham ring). The metal sheet is united with the Oldham ring by insert casting.

2 Claims, 3 Drawing Sheets

| KIND OF MATERIAL | SEIZURE TEST BY SUZUKI METHOD |
|---|---|
| | MAX. LOAD WITHOUT SEIZURE (kg/cm²) |
| | 58.8    88.4    117.9    147.4    176.9 |
| COMPARATIVE MATERIAL JIS ADC 12 | ▭▭ |
| INVENTION MATERIAL JIS SPCC | ▭▭▭▭ | ns
OLDHAM RING OF SCROLL TYPE COMPRESSOR

BACKGROUND OF THE INVENTION

The present invention relates to an Oldham ring which is one of parts constituting a scroll type compressor, and more particularly, to an Oldham ring which is the part serving to prevent a swivel scroll from revolving on its own axis.

In typical scroll type compressors, the swivel scroll is driven by a crank shaft so as to be caused to move in reciprocating motion within a plane parallel to a circular base plate of the swivel scroll. The circular base plate is formed in the bottom surface thereof with a pair of rectilinear guide grooves. An Oldham ring is disposed so as to be adjacent to and parallel with the circular base plate. The Oldham ring has a pair of first projections formed on one surface thereof adjacent to the circular base plate, the first projections being brought into engagement with the guide grooves. The Oldham ring also has a pair of second projections formed on the other surface thereof opposite to the surface on which the first projections are formed, the second projections being brought into engagement with a housing of the compressor so as to prevent the revolution of the Oldham ring. The swivel scroll is driven to reciprocate in the rectilinear direction along the pair of first projections while being restrained from moving in the direction of revolution of itself due to the engagement relationship between the guide grooves and the first projections.

In the conventional scroll type compressor, it has been general to employ a swivel scroll and an Oldham ring made of an iron system material. However, in order to reduce noise and friction loss caused due to high- o speed revolution, it has been hoped eagerly to reduce the weight of the swivel scroll and the Oldham ring of the scroll type compressor. Accordingly, reduction of weight has been realized by making the swivel scroll of aluminum as disclosed in JP-A-62-248887. Further, it has been proposed, for reduction of weight, to make both the swivel scroll and the Oldham ring of aluminum alloy. Namely, as disclosed in JP-A-2-283882, not only the swivel scroll and the Oldham ring has been made of aluminum alloy so as to reduce the weight, but also, as means for avoiding seizure, scuffing and abnormal wearing caused by the sliding movement between aluminum alloy members, an intermediate layer of iron-system material has been disposed in the engaging portion between the swivel scroll and the Oldham ring by thermal spraying the melt of the iron-system material thereto so as to ensure the high-speed revolution.

The method of treating the surface of the engagement portion between the swivel scroll and the Oldham ring as disclosed in JP-A-2-283882 encounters with the problems such as deterioration of the precision of parts caused as a result of treatment, additional cost resulting from the surface treatment, durability of the coating film and the like.

SUMMARY OF THE INVENTION

Accordingly, an object of the present invention is to improve the seizure-resistance and the wear-resistance of an Oldham ring made of aluminum alloy which engages with a swivel scroll of aluminum alloy.

According to an aspect of the present invention, there is provided an Oldham ring of a scroll type compressor having a swivel scroll made of aluminum alloy, in which the Oldham ring is made of cast aluminum alloy and has a pair of projections serving to engage with a pair of guide grooves formed on a surface of the swivel scroll adjacent to a crankshaft, and sliding surfaces of the projections which are to be brought into contact with inner surfaces of the guide grooves are each covered with a metal sheet made of a metal other than aluminum and aluminum alloys. It is preferred that the metal sheet is made of iron, copper, nickel or alloys containing at least one of the preceding metals and has Hv 90 or more of Vicker hardness. It is recommended that the metal sheet is united with the Oldham ring by insert casting in which the proximal end portions of the metal sheet are embedded in the body of the Oldham ring. It is preferred that the thickness (t) of the metal sheet satisfies the following conditions:

a) $t = 0.5 - 2.5$ mm
b) $T/20 \leq t \leq T/4$ (wherein T represents the widthwise dimension of the projection with the metal sheet in the circumferential direction of the Oldham ring)

According to another aspect of the present invention, an Oldham ring made of cast aluminum alloy is manufactured by the following method; a method of manufacturing an Oldham ring comprising the steps of: preparing a mold used for manufacturing by casting the Oldham ring which has a pair of projections serving to engage with a pair of guide grooves formed in a surface of the swivel scroll adjacent to a crankshaft; setting in a cavity of the mold metal sheets each serving to cover the sliding surface of the projection which is to be brought into contact with the inner surface of each guide groove with the base end portion thereof located in the main body of the Oldham ring; and pouring molten aluminum alloy into the mold so as to unite the metal sheets with the cast aluminum alloy.

According to the structure of the Oldham ring of the invention, since the sliding surface of each projection of the Oldham ring is covered with the thin metal sheet member, the swivel scroll and the Oldham ring which are made of aluminum alloy can avoid a sliding contact between the members made of the same aluminum alloy, with the result of suppressing of seizure, abnormal wearing, friction loss and noise generation, and reduction of weight.

DETAILED DESCRIPTION OF THE INVENTION

Figures 8, 9:
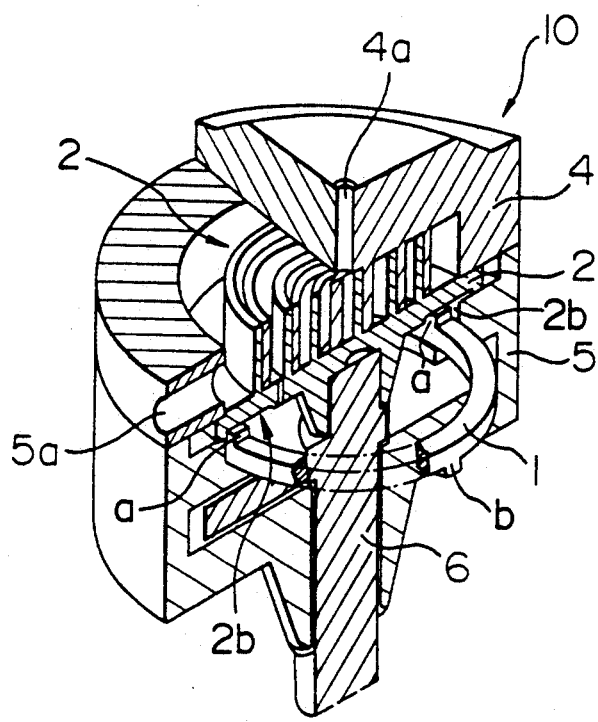
FIG. 8 is a graph showing the results of seizure test obtained from the simulation of the sliding characteristics of a conventional material and a material of the invention.
FIG. 9 is a perspective view of the scroll type compressor, showing the essential portions thereof.

FIG. 9 shows the essential portions of a scroll type compressor 10. The compressor comprises a fixed scroll) 4, a swivel scroll 2, a frame 5, an Oldham ring 1 and a crankshaft 6. Suction gas is taken into the compressor through a suction port 5a of the frame 5 and, after being compressed, discharged through a discharge port 4a of the fixed scroll 4.

Figure 1:
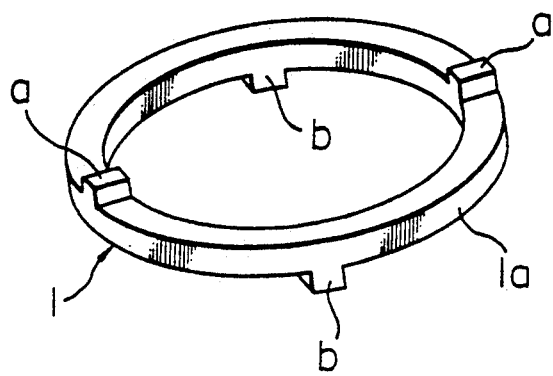
FIG. 1 is a perspective view of an Oldham ring of a scroll type compressor according to an embodiment of the invention.
Figure 2:
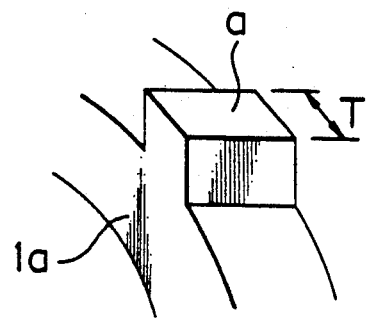
FIG. 2 is an enlarged view of the essential portion of the Oldham ring of FIG. 1, especially showing a projection thereof.

FIGS. 1 and 2 illustrate the Oldham ring 1 which serves to constitute a revolution preventing mechanism for the swivel scroll 2 in the scroll type compressor. The Oldham ring 1 and the swivel scroll 2 are made of an aluminum alloy. The Oldham ring 1 has a ring body 1a and two pairs of projections a and b which project from the ring body 1a in the axial direction. The projections a are formed on a surface of the Oldham ring which meets a circular base plate 2a of the swivel scroll 2, while the projections b are formed on the opposed surface of the Oldham ring. Each pair of projections a and a and b and b are located symmetrically with each other on the circumference of the ring body, respectively. A straight line connecting the widthwise centers of the projections a and a and another straight line connecting the widthwise centers of the projections b and b are present in two planes intersecting perpendicularly to each other, respectively. The pair of projections a and a are allowed to slide relatively with respect to key grooves (guide grooves) 2b of the swivel scroll 2.

Figure 3:
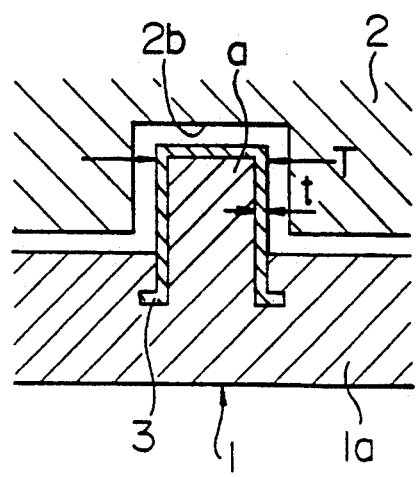
FIG. 3 is a sectional view showing the manner of engagement between a guide groove of a swivel scroll and the projection (the sliding surface of which is covered with a steel sheet) of the Oldham ring.
Figure 4:
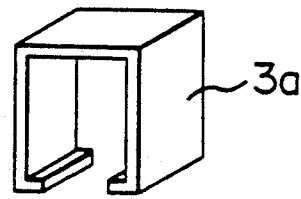
FIG. 4 is a perspective view of the steel sheet according to a modification of the invention.
Figure 5:
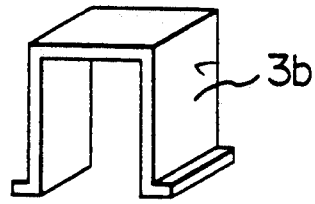
FIG. 5 is a perspective view of the steel sheet according to another modification of the invention.
Figure 6:
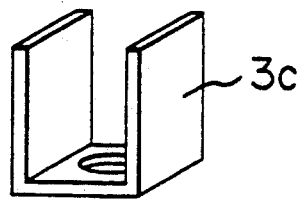
FIG. 6 is a perspective view of the steel sheet according to still another modification of the invention.
Figure 7:
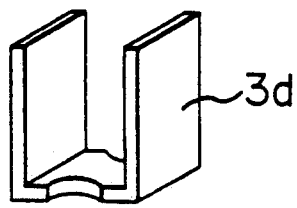
FIG. 7 is a perspective view of the steel sheet according to a further modification of the invention.

FIG. 3 shows, in enlarged section, the sliding portion between the key groove 2a of the swivel scroll 2 and the projection a of the Oldham ring 1. As shown in this drawing, a thin steel sheet 3 according to the invention has a U-letter form cross section in general and is partially embedded in the ring body 1a of the Oldham ring 1 while serving to cover the top surface and the both widthwise side surfaces of the projection a.

The Oldham ring 1 is manufactured in the following manner. First, the thin steel sheet 3 is prepared the thickness (t) of which is 0.5 to 2.5 mm that is equal to 1/20 to ¼ of the width (T) of the projection with the steel sheet. Subsequently, the thin steel sheet 3 is fitted in a predetermined position within a metallic mold of a die casting machine which corresponds to the projection a of the Oldham ring 1. Then, an aluminum alloy (such as JIS ADC12, ADC14 or AC8C, for example) is injected into the metallic mold and solidified under a pressure of 10 kg/cm² or more. As a result, the thin steel sheet 3 is firmly inserted in the casting while extending from the inside of the Oldham ring 1 to the sliding surface of the projection a.

The reason for which the thickness of the thin steel sheet was defined is as follows. A thickness below 0.5 mm tends to cause thermal deformation during casting as to make it difficult to manufacture as well as to fail to obtain the object of reinforcing the Oldham ring. While a thickness exceeding 2.5 mm is not suitable to the aim of reducing the weight. The thickness of the thin steel sheet is set to be equal to 1/20 to ¼ of the width of the projection. Under these circumstances, if the casting operation is carried out at a pressure of 10 kg/cm² or more, the molten aluminum alloy is allowed to well pass around the thin steel sheet 3 so that there are caused very few shrinkage cavities in the casting. Further, even in case of using a phosphor bronze sheet or a Monell metal sheet in Place of the thin steel plate, it was confirmed that the molten aluminum alloy is allowed to well pass around it so that there are caused little shrinkage cavities in the casting similarly to the case in which the thin steel sheet is used.

Here, FIGS. 4, 5, 6 and 7 illustrate modifications 3a, 3b, 3c and 3d of the thin steel sheet, respectively. The steel sheet 3c is formed in the bridge portion thereof with an opening into which the molten aluminum alloy is made to come so as to enhance the bonding strength between the steel sheet and the cast aluminum alloy. The steel sheet 3d is formed in the bridge portion thereof with a pair of notches due to which the same effect as that of the steel sheet 3c can be obtained. Moreover, in consideration of the bonding ability with the metal, a punched metal or a net-like one may be used as a blank material of the member 3 in place of the sheet material.

Sliding test was performed while simulating the sliding movement between the key groove (guide groove) 2a of the swivel scroll 2 and the Oldham ring 1. Test conditions are shown in Table 1 and test results are shown in FIG. 8. The test was conducted by bringing the comparison material of JIS ADC12 (containing percent by weight 1.5-3.5% Cu, 9.6-12.0% Si, not more than 0.3% Mg, not more than 1.0% Zn, not more than 1.3% Fe, not more than 0.5% Mn, not more than 0.5% Ni, not more than 0.3% Sn and the balance Al) and the present invention material of JIS SPCC (cold-rolled steel sheet) into sliding contact with the mating member of JIS ADC12. As seen from the results of this test, a sliding contact among the aluminum alloys is liable to bring about seizure but a sliding contact between the aluminum alloy and the cold-rolled steel sheet of the present invention is hard to bring about seizure.

As described above, according to the Oldham ring of the present invention, it is possible to form the swivel scroll and the Oldham ring from aluminum alloy while avoiding a sliding contact among aluminum alloys which is in fear of bringing about seizure, abnormal wearing and the like. This makes it possible to achieve the reduction of weight of the revolving part which is of great advantage to the improvement of the compression efficiency due to increase of the revolution speed, thereby the reduction of noise and friction loss may be expected.

TABLE 1

| Test Conditions Seizure Test | |
| --- | --- |
| Testing Machine | Suzuki's System of Testing Machine |
| Sample Size | Outer diameter 27.2 mm Inner diameter 22.0 mm |
| Number of Rotation | 1500 rpm |
| Peripheral Speed | 1.93 m/sec |
| Lubricating Method | Oil Bath |
| Lubricating Oil Temperature | Room Temperature |
| Mating Member | JIS ADC12 |
| Load | Starting from 29.5 kg/cm², the load is increased step by step, 30 minutes for each load. The maximum load at which no seizure takes place is measured. |
| Seizure Judgment | Judgment in which a seizure occurred is effected when the |

TABLE 1-continued

Test Conditions
Seizure Test back of a sample rises over 200° C.
in temperature of friction torque
rises over 50 kgf · cm.

What is claimed is:

1. An Oldham ring of a scroll type compressor having a swivel scroll made of aluminum alloy, the oldham ring being formed of cast aluminum alloy and having a pair of projections formed of said cast aluminum alloy and which serve to engage with a pair of guide grooves formed in a surface of the swivel scroll adjacent to a crankshaft, wherein sliding contact surfaces of the projections which are brought into contact with the inner surface of the guide grooves are each covered with sheet metal formed of iron, copper, nickel or alloys thereof and having Hv 90 or greater of Vickers hardness, united with the body of the Oldham ring such that proximal end portions of the sheet metal are embedded in the body of the Oldham ring, the sheet metal having a thickness (t) satisfying the following conditions:

(a) t=0.5–2.5 mm
(b) $T/20 \leq t \leq T/4$ (where, "T" represents the widthwise dimension of the projection in the circumferential direction of the Oldham ring).

2. An Oldham ring of a scroll type compressor having a swivel scroll made of aluminum alloy, the Oldham ring being made of cast aluminum alloy and having a pair of projections serving to engage with a pair of guide grooves formed in a surface of the swivel scroll adjacent to a crankshaft, wherein sliding surfaces of the projections which are brought into contact with the inner surface of the guide grooves are each covered with a metal sheet made of a metal other than aluminum and aluminum alloys, wherein the metal sheet is made of iron, copper, nickel or alloys containing at least one of the preceding metals and having Hv 90 or more of vickers hardness is employed as the metal sheet and is united with the body of the Oldham ring by casting, the proximal end portions of the metal sheet being embedded in the body of the Oldham ring.

* * * * *